Figure 1:
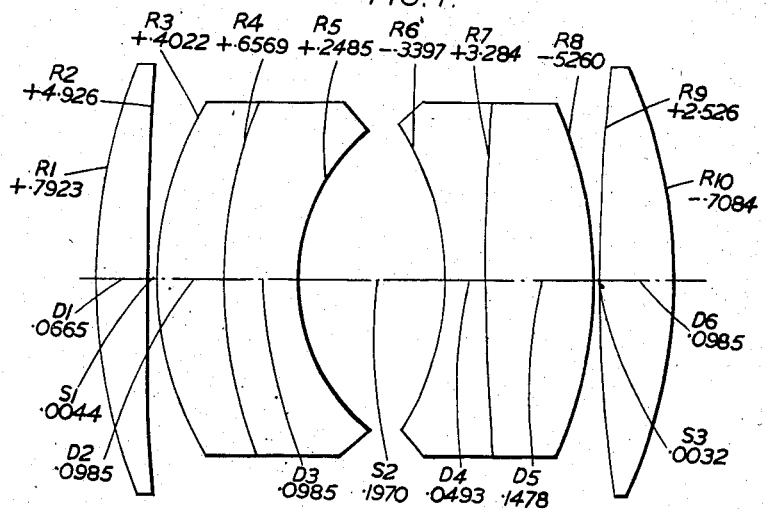

March 4, 1947.  A. WARMISHAM ET AL  2,416,969
OPTICAL OBJECTIVE
Filed June 12, 1943

Inventors
A. WARMISHAM
By G G WYNNE
Attorneys

Patented Mar. 4, 1947

2,416,969

UNITED STATES PATENT OFFICE 2,416,969

OPTICAL OBJECTIVE

Arthur Warmisham and Charles Gorrie Wynne, Leicester, England

Application June 12, 1943, Serial No. 490,636
In Great Britain October 5, 1942

6 Claims. (Cl. 88—57)

This invention relates to an optical objective for photographic or other purposes of the kind corrected for spherical and chromatic aberrations, coma, astigmatism, field curvature and distortion, and comprising two divergent components located between two simple convergent components, each divergent component consisting of a divergent element compounded with a convergent element.

It is well-known that a simple doublet can be corrected paraxially for chromatic aberration in respect of two colours by a suitable combination of flint and crown glass, but such correction does not extend throughout the spectrum and there is a residual colour aberration known as secondary spectrum.

The present invention has for its object to provide in an objective of the above kind a much higher degree of correction for secondary spectrum than hitherto without sacrificing the corrections for astigmatism, field curvature and distortion.

In the objective according to the invention the two divergent elements are each made of an alkaline halide crystal, and the materials of which all the elements are made have substantially the same relative partial dispersion. The relative partial dispersion, usually represented by the symbol $\theta$, may be defined by the mathematical expression $$\frac{n_g - n_e}{n_F - n_C}$$

where $n_C$, $n_e$, $n_F$ and $n_g$ are respectively the refractive indices for the spectrum lines C, e, F and g.

Preferably, the materials used for the divergent elements have mean refractive index between 1.53 and 1.58 and Abbe V number between 30.0 and 33.0, whilst those used for the convergent elements have mean refractive index between 1.59 and 1.63 and Abbe V number between 52.0 and 62.0. Thus potassium bromide crystal may be used for the divergent elements, and a dense barium crown glass or glasses for the convergent elements. Conveniently the mean refractive index of the material used for each divergent element is greater than that of the material used for the convergent element cemented to it by at least .05.

The cemented surfaces in the two divergent components are preferably such that (regarding a cemented surface as having positive curvature if concave to the diaphragm and as having negative curvature if convex thereto) the algebraic sum of the curvatures of the two cemented surfaces is positive. When the overall axial length of the objective lies between .55 and .65 times the equivalent focal length of the objective, such algebraic sum preferably lies between 3.0 and 1.5 times the reciprocal of such equivalent focal length, whilst when the overall length is between .65 and .80 times the equivalent focal length, the algebraic sum preferably lies between 2.0 and 1.0 times the reciprocal of the equivalent focal length.

Figure 2:
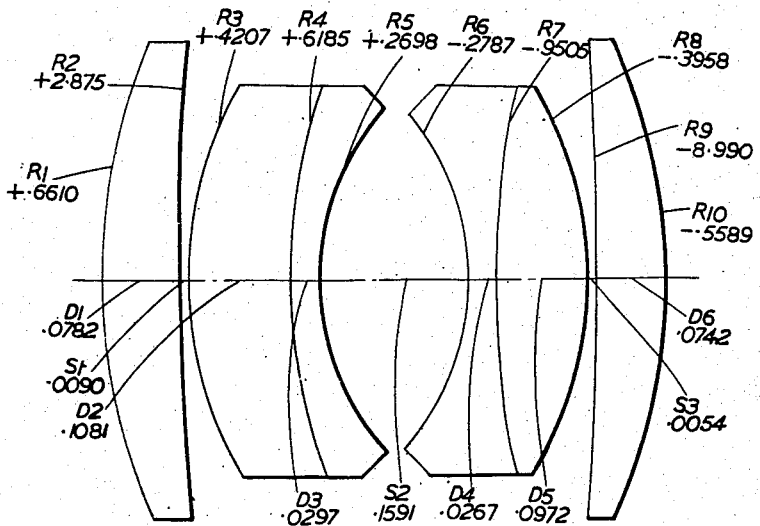

In the accompanying drawings,

Figures 1 and 2 respectively illustrate two convenient practical examples of objective according to the invention.

Numerical data for these two examples are given in the following tables, in which $R_1 R_2 \ldots$ represent the radii of curvature of the individual lens surfaces counting from the front (that is from the side of the longer conjugate) the positive sign indicating that the surface is convex to the front and the negative sign that it is concave thereto, $D_1 D_2 \ldots$ represent the axial thicknesses of the various elements, and $S_1 S_2 S_3$ the axial air separations between the components. The tables also give the mean refractive indices $n_D$ and the Abbe V numbers of the materials of which the individual elements are made.

Example I

| Equivalent focal length 1.000 | | Relative aperture F/2.0 | | |
|---|---|---|---|---|
| Radius | Thickness or air separation | Refractive index $n_D$ | Abbe V number | Relative partial dispersion |
| $R_1 +.7923$ | $D_1$ .0665 | 1.6154 | 59.4 | .999 |
| $R_2 +4.926$ | $S_1$ .0044 | | | |
| $R_3 +.4022$ | $D_2$ .0985 | 1.6154 | 56.3 | 1.008 |
| $R_4 +.6569$ | $D_3$ .0985 | 1.558 | 31.5 | 1.000 |
| $R_5 +.2485$ | $S_2$ .1970 | | | |
| $R_6 -.3397$ | $D_4$ .0493 | 1.558 | 31.5 | 1.000 |
| $R_7 +3.284$ | $D_5$ .1478 | 1.6154 | 59.4 | .999 |
| $R_8 -.5260$ | $S_3$ .0032 | | | |
| $R_9 +2.526$ | $D_6$ .0985 | 1.6154 | 56.3 | 1.008 |
| $R_{10} -.7084$ | | | | |

In this example potassium bromide crystal is used for the third and fourth elements, which are divergent, whilst the two convergent elements respectively cemented thereto are made of two slightly different dense barium crown glasses, which are also used respectively for the rear and front simple convergent components. The relative partial dispersions of the potassium bromide crystal and the two dense barium crown glasses are all approximately 1.00.

The second example also employs potassium bromide crystal for the divergent elements, but in conjunction with three other dense barium crown glasses all having relative partial dispersions approximately 1.00.

*Example II*

| Equivalent focal length 1.000 | | Relative aperture F/2.0 | | |
|---|---|---|---|---|
| Radius | Thickness or air separation | Refractive index $n_D$ | Abbe V number | Relative partial dispersion |
| $R_1$+.6610 | $D_1$ .0782 | 1.6105 | 53.3 | 1.016 |
| $R_2$+2.875 | $S_1$ .0090 | | | |
| $R_3$+.4207 | $D_2$ .1081 | 1.6128 | 59.3 | .999 |
| $R_4$+.6185 | $D_3$ .0297 | 1.558 | 31.5 | 1.000 |
| $R_5$+.2698 | $S_2$ .1591 | | | |
| $R_6$−.2787 | $D_4$ .0267 | 1.558 | 31.5 | 1.000 |
| $R_7$−.9505 | $D_5$ .0972 | 1.6216 | 60.2 | .998 |
| $R_8$−.3958 | $S_3$ .0054 | | | |
| $R_9$−8.990 | $D_6$ .0742 | 1.6128 | 59.3 | .999 |
| $R_{10}$−.5589 | | | | |

In Example I, the overall axial length of the objective is .7637, the curvature of the front cemented surface $R_4$ which is concave to the diaphragm is about 1.52 and that of the rear cemented surface $R_7$ which is convex to the diaphragm is about 0.30.

In Example II, the overall axial length is .5876, the curvature of $R_4$ which is again concave to the diaphragm is about 1.61 and that of $R_7$ which is also concave to the diaphragm is about 1.05.

It will be appreciated that the foregoing arrangements have been described by way of example only and that the invention may be carried into practice in other ways.

What we claim as our invention and desire to secure by Letters Patent is:

1. An optical objective, corrected for spherical and chromatic aberrations, coma, astigmatism, field curvature and distortion, and comprising two simple convergent components, and two compound divergent components located between the convergent components and each consisting of a convergent element compounded with a divergent element made of a material having mean refractive index lying between 1.53 and 1.58 and Abbe V number lying between 30.0 and 33.0, the materials used for the four convergent elements each having mean refractive index lying between 1.59 and 1.63 and Abbe V number lying between 52.0 and 62.0, whilst the materials used for all six elements have substantially the same relative partial dispersion, and in which the overall axial length of the objective lies between .55 and .65 times the equivalent focal length of the objective, and the algebraic sum of the curvatures of the cemented surfaces in the two divergent components (regarding such curvature as positive if the surface is concave to the diaphragm and negative if the surface is convex thereto) is positive and lies between 3.0 and 1.5 times the reciprocal of such equivalent focal length.

2. An optical objective, corrected for spherical and chromatic aberrations, coma, astigmatism, field curvature and distortion, and comprising two simple convergent components, and two compound divergent components located between the convergent components and each consisting of a convergent element compounded with a divergent element made of potassium bromide crystal, the four convergent elements each being made of a dense barium crown, glass having substantially the same relative partial dispersion as the crystal and in which the overall axial length of the objective lies between .55 and .65 times the equivalent focal length of the objective, and the algebraic sum of the curvatures of the cemented surfaces in the two divergent components (regarding such curvature as positive if the surface is concave to the diaphragm and negative if the surface is convex thereto) is positive and lies between 3.0 and 1.5 times the reciprocal of such equivalent focal length.

3. An optical objective, corrected for spherical and chromatic aberrations, coma, astigmatism, field curvature and distortion, and comprising two simple convergent components, and two compound divergent components located between the convergent components and each consisting of a convergent element compounded with a divergent element made of a material having mean refractive index lying between 1.53 and 1.58 and Abbe V number lying between 30.0 and 33.0, the materials used for the four convergent elements each having mean refractive index lying between 1.59 and 1.63 and Abbe V number lying between 52.0 and 62.0, whilst the materials used for all six elements have substantially the same relative partial dispersion, and in which the overall axial length of the objective lies between .65 and .80 times the equivalent focal length of the objective, and the algebraic sum of the curvatures of the cemented surfaces in the two divergent components (regarding such curvature as positive if the surface is concave to the diaphragm and negative if the surface is convex thereto) is positive and lies between 2.0 and 1.0 times the reciprocal of such equivalent focal length.

4. An optical objective, corrected for spherical and chromatic aberrations, coma, astigmatism, field curvature and distortion, and comprising two simple convergent components, and two compound divergent components located between the convergent components and each consisting of a convergent element compounded with a divergent element made of potassium bromide crystal, the four convergent elements each being made of a dense barium crown, glass having substantially the same relative partial dispersion as the crystal and in which the overall axial length of the objective lies between .65 and .80 times the equivalent focal length of the objective, and the algebraic sum of the curvatures of the cemented surfaces in the two divergent components (regarding such curvature as positive if the surface is concave to the diaphragm and negative if the surface is convex thereto) is positive and lies between 2.0 and 1.0 times the reciprocal of such equivalent focal length.

5. An optical objective having numerical data substantially as set forth in the following table:

| Equivalent focal length 1.000 | | Relative aperture F/2.0 | | |
|---|---|---|---|---|
| Radius | Thickness or air separation | Refractive index $n_D$ | Abbe V number | Relative partial dispersion |
| $R_1 + .7923$ | $D_1$ .0665 | 1.6154 | 59.4 | .999 |
| $R_2 + 4.926$ | $S_1$ .0044 | | | |
| $R_3 + .4022$ | $D_2$ .0985 | 1.6154 | 56.3 | 1.008 |
| $R_4 + .6569$ | $D_3$ .0985 | 1.558 | 31.5 | 1.000 |
| $R_5 + .2485$ | $S_2$ .1970 | | | |
| $R_6 - .3397$ | $D_4$ .0493 | 1.558 | 31.5 | 1.000 |
| $R_7 + 3.284$ | $D_5$ .1478 | 1.6154 | 59.4 | .999 |
| $R_8 - .5260$ | $S_3$ .0032 | | | |
| $R_9 + 2.526$ | $D_6$ .0985 | 1.6154 | 56.3 | 1.008 |
| $R_{10} - .7084$ | | | | | in which $R_1 R_2 \ldots$ represent the radii of curvature of the individual lens surfaces counting from the front (that is from the side of the longer conjugate) the positive sign indicating that the surface is convex to the front and the negative sign that it is concave thereto, $D_1 D_2 \ldots$ represent the axial thicknesses of the various elements, and $S_1 S_2 S_3$ the axial air separations between the components.

6. An optical objective having numerical data substantially as set forth in the following table:

| Equivalent focal length 1.000 | | Relative aperture F/2.0 | | |
|---|---|---|---|---|
| Radius | Thickness or air separation | Refractive index $n_D$ | Abbe V number | Relative partial dispersion |
| $R_1 + .6610$ | $D_1$ .0782 | 1.6105 | 53.3 | 1.016 |
| $R_2 + 2.875$ | $S_1$ .0090 | | | |
| $R_3 + .4207$ | $D_2$ .1081 | 1.6128 | 59.3 | .999 |
| $R_4 + .6185$ | $D_3$ .0297 | 1.558 | 31.5 | 1.000 |
| $R_5 + .2698$ | $S_2$ .1591 | | | |
| $R_6 - .2787$ | $D_4$ .0267 | 1.558 | 31.5 | 1.000 |
| $R_7 - .9505$ | $D_5$ .0972 | 1.6216 | 60.2 | .998 |
| $R_8 - .3958$ | $S_3$ .0054 | | | |
| $R_9 - 8.990$ | $D_6$ .0742 | 1.6128 | 59.3 | .999 |
| $R_{10} - .5589$ | | | | | in which $R_1 R_2 \ldots$ represent the radii of curvature of the individual lens surfaces counting from the front (that is from the side of the longer conjugate) the positive sign indicating that the surface is convex to the front and the negative sign that it is concave thereto, $D_1 D_2 \ldots$ represent the axial thicknesses of the various elements, and $S_1 S_2 S_3$ the axial air separations between the components.

ARTHUR WARMISHAM.
CHARLES GORRIE WYNNE.

REFERENCES CITED

The following references are of record in the file of this patent:

UNITED STATES PATENTS

| Number | Name | Date |
|---|---|---|
| 1,955,591 | Lee | Apr. 17, 1934 |
| 2,117,252 | Lee | May 10, 1938 |
| 2,194,413 | Warmisham | Mar. 19, 1940 |
| 1,541,407 | Spannenberg | June 9, 1925 |
| 2,085,437 | Michelssen | June 29, 1937 |
| 2,262,998 | Frederick et al. | Nov. 18, 1941 |
| 2,252,681 | Aklin | Aug. 19, 1941 |
| 583,336 | Rudolph | May 25, 1897 |